(12) United States Patent
Korshunov et al.

(10) Patent No.: US 10,467,187 B1
(45) Date of Patent: Nov. 5, 2019

(54) SYSTEM AND METHOD FOR RESTORATION OF MICROSOFT EXCHANGE SERVER MAIL

(71) Applicant: Acronis International GbmH, Schaffhausen (CH)

(72) Inventors: Igor E. Korshunov, Moscow (RU); Maxim V. Lyadvinsky, Moscow (RU); Serguei M. Beloussov, Singapore (SG); Alexey Sergeev, Moscow (RU)

(73) Assignee: Acronis International GbmH, Schaffhausen (CH)

( * ) Notice: Subject to any disclaimer, the term of this patent is extended or adjusted under 35 U.S.C. 154(b) by 862 days.

(21) Appl. No.: 14/969,114

(22) Filed: Dec. 15, 2015

Related U.S. Application Data

(63) Continuation-in-part of application No. 12/469,269, filed on May 20, 2009, now Pat. No. 9,213,697.

(51) Int. Cl.
*G06F 16/11* (2019.01)
*H04L 12/58* (2006.01)

(52) U.S. Cl.
CPC .............. *G06F 16/11* (2019.01); *H04L 51/22* (2013.01)

(58) Field of Classification Search
CPC ........................... G06F 17/30592; G06F 16/11
See application file for complete search history.

(56) References Cited

U.S. PATENT DOCUMENTS

| | | | | |
|---|---|---|---|---|
| 7,885,938 B1* | 2/2011 | Greene | ............... | G06F 11/1469 707/674 |
| 9,542,397 B1* | 1/2017 | Graham | ................ | G06F 3/065 |
| 2006/0031357 A1* | 2/2006 | Misra | ..................... | H04L 51/22 709/206 |
| 2007/0220308 A1* | 9/2007 | Yeung | ................. | G06F 11/1458 714/5.1 |
| 2008/0082975 A1* | 4/2008 | Oney | .................. | G06F 9/45558 718/1 |
| 2008/0109448 A1* | 5/2008 | Aboel-Nil | ............ | G06Q 10/107 707/10 |
| 2010/0269164 A1* | 10/2010 | Sosnosky | ............ | H04L 67/1095 726/7 |

* cited by examiner

*Primary Examiner* — Dawaune A Conyers
(74) *Attorney, Agent, or Firm* — Michael Fainberg; Arent Fox LLP

(57) ABSTRACT

A system, method and computer program product for restoration of MICROSOFT Exchange Server mail. MICROSOFT Exchange Server mail is retrieved from a virtual copy of the MICROSOFT Exchange database. Virtualization is implemented by a system filter. Logs are applied to a virtualized DB in order to synchronize it with a real DB of the MICROSOFT Exchange. The data located in the remote archive does not need to be copied into the real folder, because the data is made available by virtualization means. After the logs are applied, the virtualized DB is opened (without being mounted) from files from the virtual folder. From this point on, the DB of MICROSOFT Exchange can be viewed and the data can be queried and retrieved from the virtualized DB. Thus, a single message or a mailbox can be retrieved very fast, as if it were being retrieved from a real MICROSOFT Exchange DB.

20 Claims, 4 Drawing Sheets

SYSTEM AND METHOD FOR RESTORATION OF MICROSOFT EXCHANGE SERVER MAIL

CROSS-REFERENCE TO RELATED APPLICATIONS

This application is a continuation in part of U.S. patent application Ser. No. 12/469,269, filed on May 20, 2009, incorporated herein by reference in its entirety.

BACKGROUND OF THE INVENTION

Field of the Invention

The present invention is related to restoration of a MICROSOFT Exchange Server mail, and more particularly, to restoration of backed up MICROSOFT Exchange server mails without actual restoration of the MICROSOFT Exchange Server database.

Description of the Related Art

Electronic mail has become an invaluable application for most of the enterprises over a past decade. However, initially it was difficult to implement reserve copying (i.e., backup) and restoration of the email-related information. If the system failed, some data was not recoverable, thus causing significant damage to an enterprise. Therefore, it is very important for an enterprise to implement effective approach for reserve copying and recovery of data without producing a significant operational overhead.

A MICROSOFT Exchange Server is a distributed database and an information exchange environment having a functionality of a mail client intended for an internal use (i.e., information exchange among employees of an enterprise). Most of the critical information of the enterprise is stored in the database of the MICROSOFT Exchange Server. In order to protect this information in case of system failure or user error, a regular backup of the MICROSOFT Exchange mail data is needed.

A full back up of the MICROSOFT Exchange server is a costly process. However, a restoration of a single message, of a group of messages, or of a mail box is not conventionally possible. It can only be possible if the database (DB) of the MICROSOFT Exchange Server is backed up at a "brick-level" (i.e., back up of each message one by one). Typically the MICROSOFT Exchange Server DB is backed up at a DB-level, which makes impossible restoration of a single message or of a particular mailbox.

The brick-level backup can take up to several hours, while DB-level backup takes dozens of minutes. However, backup of the entire DB takes up a lot of resources and can be quite costly.

Therefore, a method for fast and efficient restoration of the MICROSOFT Exchange Server mail without the restoration of the entire MICROSOFT Exchange Server DB is desired.

SUMMARY OF THE INVENTION

The present invention is related to a method for fast restoration of mail from the MICROSOFT Exchange Server, and more particularly, to restoration of backed up MICROSOFT Exchange Server mail without a restoration of the entire MICROSOFT Exchange Server database.

In exemplary embodiment, a MICROSOFT Exchange Server mail is retrieved from a virtual copy of the MICROSOFT Exchange database. Virtualization is implemented by a system filter. Logs are applied to a virtualized DB in order to synchronize it with a real DB of the MICROSOFT Exchange. This can be done using de-archiving of the database files or the logs can be applied to the already backed up database files by using special applications that allow working with the backed up files as if they were stored on a regular hard drive and not on a reserve storage.

The data located in the remote archive does not need to be copied into the real folder, because the data is made available by virtualization means. After the logs are applied, the virtualized DB is launched (without being mounted) from files from the virtual folder. From this point on, the DB of MICROSOFT Exchange can be viewed and the data can be queried and retrieved from the DB.

Thus, a single message or a mailbox can be retrieved very fast, as if it were being retrieved from a real MICROSOFT Exchange DB. The data can be queried and retrieved from the virtualized DB of the MICROSOFT Exchange. The file data can be moved from the archive into the real folder while the MICROSOFT Exchange Server remains open and the database being restored is assembled.

The retrieved data is assembled into mail messages. Then, the assembled messages can be stored into a virtual folder or directly into the real folder.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
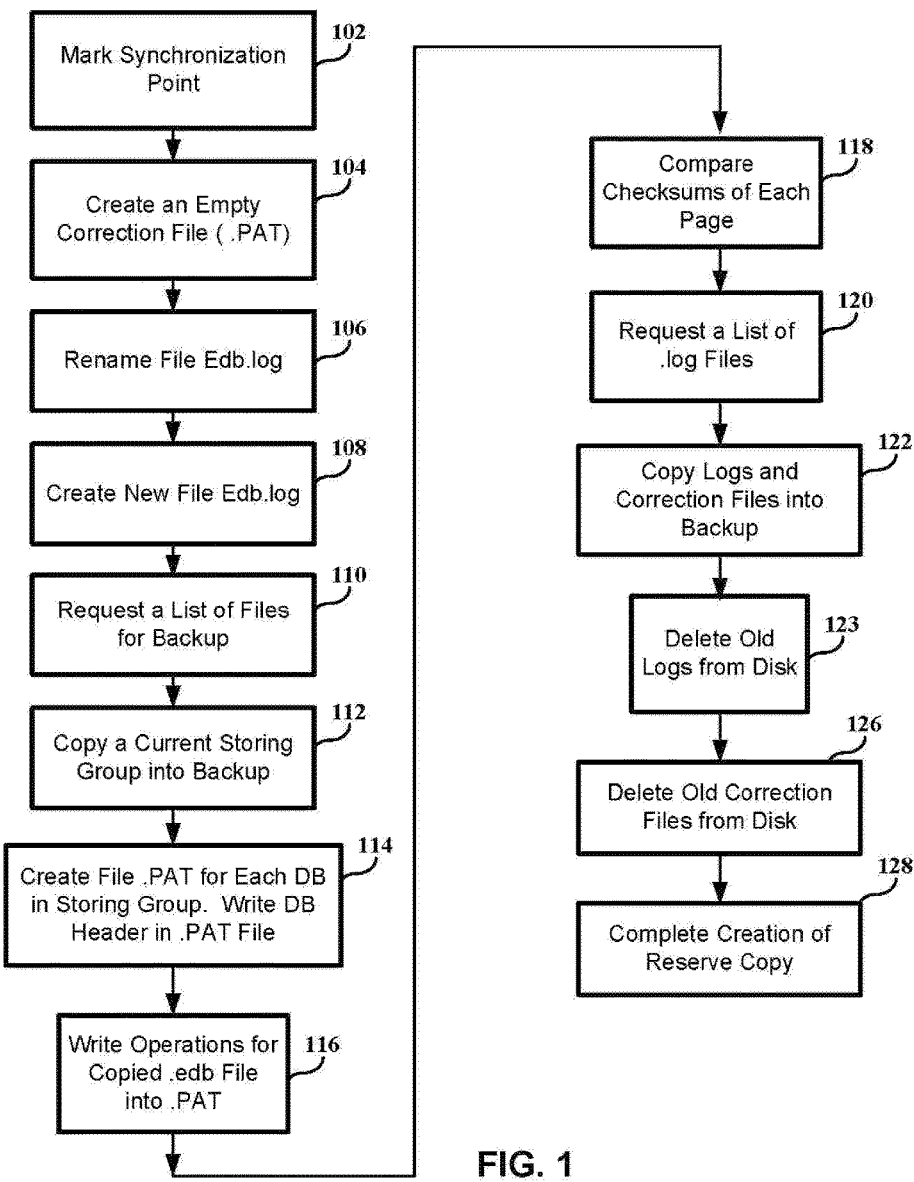
FIG. 1 illustrates a flowchart of a backup of an MICROSOFT Exchange Server database in accordance with the exemplary embodiment.

Reference will now be made in detail to the preferred embodiments of the present invention, examples of which are illustrated in the accompanying drawings.

The present invention is related to a system, method and computer program product for fast restoration of backed up MICROSOFT Exchange Server mail without restoration of the entire MICROSOFT Exchange Server database (and without mounting the database in the physical file system below a filter inserted into the driver stack, and without registering it with MICROSOFT Exchange Server) that substantially obviates one or more of the disadvantages of the related art.

According to an exemplary embodiment, MICROSOFT Exchange Server mail is retrieved from a virtualized MICROSOFT Exchange database. Virtualization is implemented by a system filter. For example, it can be done using virtual folders as a well-established construct in operating systems. For example, BeOS includes a version of virtual folders referred to as "saved queries" that has since influenced the development of virtual folder features in operating systems like Mac OS X, WINDOWS and LINUX.

These virtual folders are populated dynamically by executing a search on the entire file system, or a subset of it, or by using the cached version of the search. Logs are applied to a virtualized DB in order to synchronize it with a real DB of the MICROSOFT Exchange. The DB logs reflect changes that happened to the DB files during backup, i.e., a journal of the transactions. The DB logs are also backed up and the backed up logs can be applied to the backed up database files. Thus, a state of the DB at any time can be made available.

This can be done using de-archiving of the database files or the logs can be applied to the already backed up database files, by using special applications that allow working with the backed up files as if they were stored on a regular hard drive and not on a reserve storage. The data located in the remote archive does not need to be copied into the real folder, because the data is made available by virtualization means, such as the Mounting Point Manager utility, which puts archive data into a virtual folder.

An archive, in the context of the present discussion, is an entity that, to the outside, normally appears as a single file (or sometimes as a set of files, databases, objects in an object store (e.g., Microsoft Azure, Amazon S3, etc.), and represents a structured data store. Examples of such archives are .zip, .tib, .rar, and many others. The archive can also be compressed and/or encrypted. Some sort of key (or an internal identifier) is used to find and access specific data blocks in the archive, and to then reconstruct the original item (e.g., file, email, folder, object, and so on) from an internal representation of the data in the archive.

After the logs are applied, the DB is opened from files from the virtual folder (without being mounted, so that MICROSOFT Exchange is not itself aware of the database, and the database is not registered with MICROSOFT Exchange). The virtual folder is a directory where the virtualized archived database files are stored. Unlike conventional redirect links that are supported by most modern operating systems/file systems, the virtual folder does not directly correspond to any entity on a physical storage (e.g., on a hard disk), even though formally the virtual folder is mounted in the file system. The virtual file or folder, in reality, is part of an archive.

As another option, that file/folder might not exist anywhere and its contents could be generated in response to some event. Moreover a virtual folder is used initially in an application, that folder doesn't exist anywhere and it is entirely virtual and is used as a container for virtual DB files that are really in an archive.

The data of the archive itself can by physically stored somewhere else—e.g., another drive, a network drive, a cloud storage, etc. Note that the same concept can be applied to virtual files, and not just virtual folders. In a sense, a virtual folder is a virtual file with more complex internal structure, but, regardless, the key point here is that any elements of the driver stack below a special system driver filter is unaware of its existence, and the special system driver filter, inserted into the driver stack of the OS, intercepts access requests to the virtual file or folder, and, instead of generating an error, redirects them to the archive. A user space application then works with the archive to reconstruct the files (such as database files) from data within the archive. Thus, objects of the mail server can be recovered in this manner from the virtual folder, using an API of the database (e.g., JET,—now renamed ESE).

As a further option, the database in the virtual folder can be registered with MICROSOFT Exchange (or another mail server) temporarily, and the mail server can send requests to the database in the virtual folder (even though the database itself is not mounted in the file system).

As a further option, the database whose data that is being restored can itself be a virtual file (i.e., without being archived, but stored somewhere where the OS driver stack below the system driver filter is unaware of it).

More generally, the concept of granular object recovery is applicable to recovery of other entities, such as database servers (not just mail servers), Active Directory (see https:**en.wikipedia.org/wiki/Active_Directory) and so on. In the case of Active Directory the data that can be recovered includes domain properties, user properties/attributes (name, email address, domain group membership, etc.), user registrations in a domain, user access policies, and other data maintained by Active Directories. Similarly, the concept is applicable to recovering data from any database on an underlying layer (Microsoft SharePoint over Microsoft SQL, SAP over Oracle, Microsoft Active Directory) by a user space application through APIs provided by the corresponding database product, such as ESE (Jet), etc.

A database can be assembled from the files located in the virtual folder. From this point on, the DB of MICROSOFT Exchange can be viewed and the data can be queried and retrieved from the virtualized DB. Thus, objects of the mail server, such as a single message, an email folder, an email object or a mailbox can be retrieved very fast by reading the corresponding record set(s) from the archive, as if it were being retrieved from a real MICROSOFT Exchange DB.

The data can be queried and retrieved from the virtualized DB of the MICROSOFT Exchange. The retrieved data can be assembled into mail messages in a granular manner, i.e., if so desired, one email at a time (or one set of emails at a time), or more broadly, one object at a time. Such objects can include the individual emails themselves, an entire mailbox, an entire inbox/sent/delete folder, a specific email folder or subfolder, contact(s), appointments, notes, RSS feeds, and so on—in other words, anything that the mail server recognizes as an object. Then, the assembled messages (or, more generally, objects) can be stored into a virtual folder, directly into the real folder or to a MICROSOFT Exchange mailbox.

According to the exemplary embodiment, in order to be virtualized, the MICROSOFT Exchange DB needs to be backed up (at DB-level) in a very short time. FIG. 1 illustrates a flowchart of a method for rapid backup of a MICROSOFT Exchange Server database in accordance with the exemplary embodiment The process of reserve on-line copying (i.e., run-time backup) of the MICROSOFT Exchange Server is started by launching a reserve copying application. This application calls a Web Storage System Service (WSS) service, indicating the desired type of reserve copying. Then, the backup process is started at step 102 by marking a synchronization point of the backup.

A this point, the WSS informs an Exchange Server Engine (ESE) that it is in a reserve copying mode and an empty correction file (".PAT") is created at step 104 for each database being backed up. Note that in the exemplary embodiment, during the process of an online backup, the database is open for access and transactions can still be recorded in the database. If a transaction invokes an operation for an already copied database file (".edb") over the point of the reserve copying (i.e., a flag in ".edb" file indicating what is already copied and what is not yet copied), the page before the reserve copying point is written into a correction file ".PAT".

A separate ".PAT" file for each backed up database is used. When the ESE is placed into a reserve copying mode, a new log file is open. For example, if a log file "edb.log" is currently open, it is closed and renamed at step 106 in order to correspond to a latest set of transactions. Then, a new file "edb.log" is created at step 108.

Then, at step 110, a list of files for backup is requested from the MICROSOFT Exchange Server. At step 112, the files from a list requested at step 110 (i.e., a current storing group) are copied into the backup archive. The database pages are ordered at step 114 by creating a correction file (".PAT") for each database and writing the database header into the correction file.

The pages are grouped into fragments of 64 KB each (i.e., 16 4-KB pages) and loaded into an operating memory. The operations corresponding to each copied database (".edb" file) are written into the correction file (i.e., ".PAT" file) at step 116. Then, the ESE checks a checksum for each page in order to confirm the integrity of data at step 118.

A checksum can be in a form of a hash string consisting of 4-byte segments. Such a hash string is generated and added to each page of the database for controlling the integrity of the page. The original checksum of the page is compared to a checksum of the page read into a RAM. Thus, it is verified that the data read out of the database and the data written into the database are identical.

MICROSOFT Exchange database page has the first 82 bytes allocated for page headers and flags indicating page type, as well as information about the data types contained in the page. When the page is loaded into memory, the checksum is calculated and a page number is verified. If the checksum does not match the original checksum, this means that the page is corrupted. The ESE, in this case, will return an error, the database will be suspended and information about the corrupted page is recorded in the transaction log.

Note that the ESE does not cure page corruption, but only notifies about corrupted pages. The page corruption takes place at the point when data is written onto a disk. In most cases, corruption of database pages is caused by equipment or device driver failure. It is important to make sure that the drivers are updated and the latest versions are used.

Comparing the checksums prevents storing corrupted data. Thus, a successfully created reserve copy of the MICROSOFT Exchange Server database is guaranteed to be not corrupted, since each individual page is checked prior to copying it into a reserve database. After verification of the checksums at step 118, a list of log files (".log") that are needed to be backed up is requested from the MICROSOFT Exchange Server at step 120. Then, at step 122, the logs and correction files are copied into the backup.

Then, the logs are truncated or deleted at step 124 when a new generation of files is created at the beginning of reserve copying. Also, old correction files are erased from the disk at step 126. Then, the reserve files are closed, the ESE goes into a normal mode of operation and the reserve copying is completed at step 128.

Figure 2:
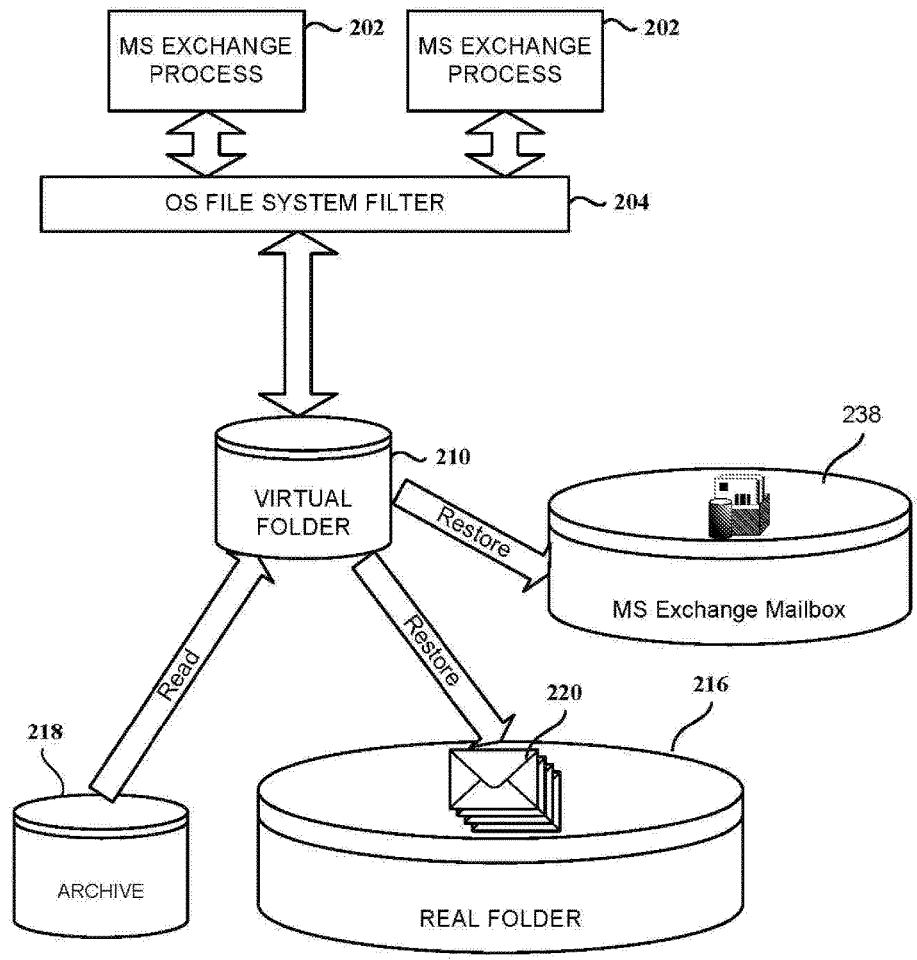
FIG. 2 illustrates a system for virtualization of an MICROSOFT Exchange Server database in accordance with an exemplary embodiment.

FIG. 2 illustrates a system for virtualization of a MICROSOFT Exchange Server database in accordance with the exemplary embodiment. The virtualization process is started by a launch of an OS file system filter 204. MICROSOFT Exchange processes 202 are passed through the OS file system filter 204. Also, one or more OS thread processes may be executed in parallel with the MICROSOFT Exchange processes 202. An OS I/O subsystem is in communication with the file system filter 204.

A virtual folder 210 is used for virtualizing data from the MICROSOFT Exchange DB archive and for restoring mails to a real folder 216. Note that the archive can implemented on remote location. A virtual folder denotes an organizing principle for files and folders that is not dependent on their physical location in a folder. Instead, they can consist of scripts (or other mechanisms) that coalesce results from a data store, which may be a database or a custom index, and presents them visually in the format in which folder views are presented. Files and folders of DB of the MICROSOFT Exchange are not stored in a virtual folder, since physically a virtual folder is just a file storing a search query. Any attempt to store a file of folder in a virtual folder, depending on the implementation, is redirected to some physical store.

Then, the content of the virtual folder 210 is implemented as a DB of the MICROSOFT Exchange (i.e., virtualized DB). The data can be queried and retrieved from the DB of the MICROSOFT Exchange. The retrieved data can be assembled into messages using, for example, Mail Application Programming Interface (MAPI). Then, the restored messages 220 can be stored into a virtual folder 210, or directly into the real folder 216, or into the MICROSOFT Exchange mailbox 238. The MAPI is an application that works with mail systems. The MAPI allows to receive and send messages, as well as to attach files or other objects to the messages.

Virtualization of the archived files of the remote archive 218 in the virtual folder 210 with the subsequent application of the backed up logs allows using the backed up database files for requesting data from the DB and for assembling messages from the retrieved data with a subsequent restoration of the messages 220 into the real folder 216, or into the MICROSOFT Exchange mailbox 238.

Figure 3:
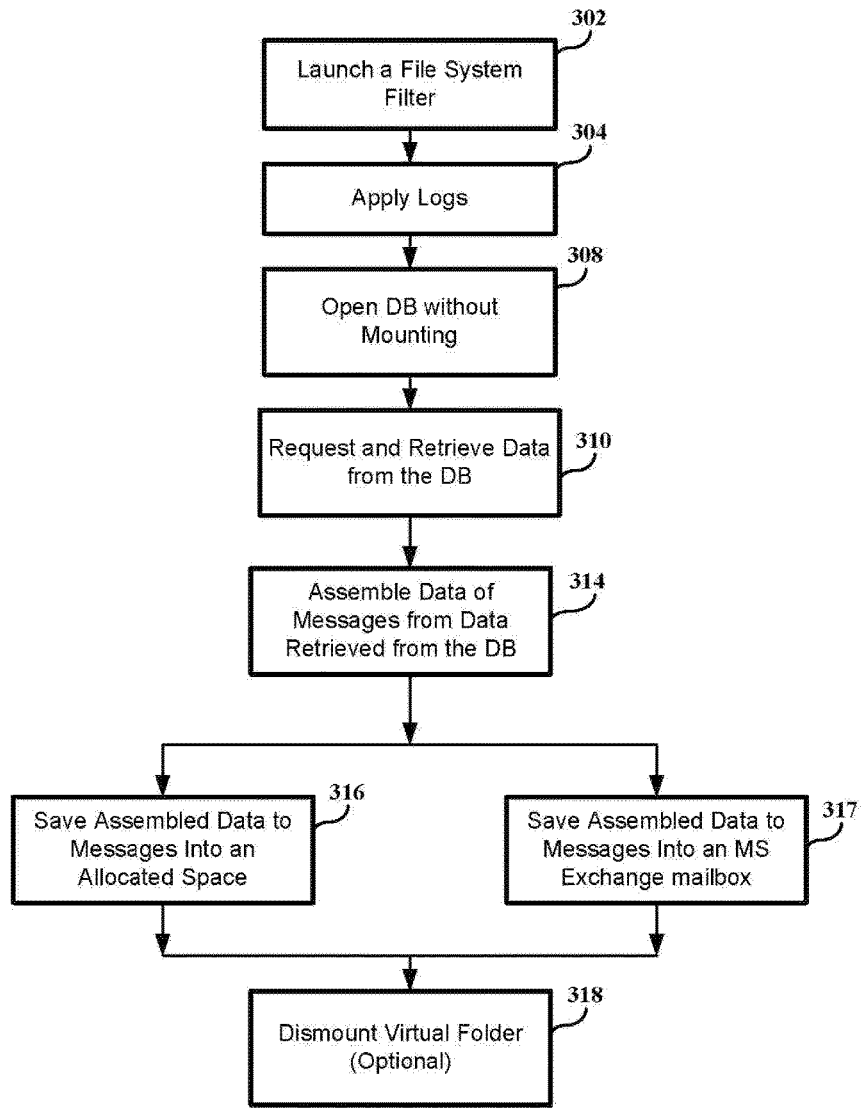
FIG. 3 illustrates a method for restoring a message from the MICROSOFT Exchange Server database.

FIG. 3 illustrates a method for restoring a message from the MICROSOFT Exchange Server database in accordance with the exemplary embodiment. FIG. 3 depicts a data-flow diagram employing a virtual folder 210 (see FIG. 2). A system filter 204 (see FIG. 2) is launched at step 302 and the logs are applied to a database at step 304. Note that the logs can be applied before step 302. In other words, the backed up logs can be applied to the backed up database files.

This can be done using de-archiving of the database files or the logs can be applied to the already backed up database files by using special applications that allow working with the backed up files as if they were stored on a regular hard drive and not on a reserve storage. In this case, data located in the remote archive does not need to be copied into the real folder, because the data is made available by virtualization means, such as a Mounting Point Manager.

For example, recordation in MICROSOFT Exchange Server 2000 (2003) can be allowed from one location. Tracking log files is stored in the folder "\Exchsrvr\YourServerName.log", where "YourServerName" is the name of the MICROSOFT Exchange Server.

Each day, a new file can be created with a name "yyyymmdd.log", where "yyyymmdd" is a date of file creation.

After the logs are applied, at step 304, the database is opened using files from the virtual folder at step 308. Note that the database is not mounted at step 308. The mounting of the DB is not necessary, because it is time consuming, and it is not necessary to work with mails from DB as usual. By opening a DB, it is possible to extract all necessary information from a DB. From this point on, the DB of MICROSOFT Exchange can be viewed and the data can be queried and retrieved from the DB at step 310.

DB data retrieval commands can be similar to the commands (i.e., queries) for an SQL server. For example:
SELECT * from table where RecipAddress=qwerty@qwerty.qw In this case, the data for a recipient having an email address qwerty@qwerty.qw will be retrieved from the virtualized DB. The data can have special variables assigned for storing the data. For example, A can be assigned for recipient's address, B for message subject and C for message content. The email messages can be created from the assigned variables in the form of separate files.

According to the exemplary embodiment, any type of a search filter can be used on the virtualized DB. For example, in order to prevent retrieval of spam messages, the filter can use special parameters, such as message subject, message content, sender's name, message recipient, etc. It can also use message attributes, such as date of creation and date of receipt. Certain information of the message content can be used for filtering as well. For example, if the content has some embedded advertisement, it can be filtered out based on particular words or phrases.

The message parameters/attributes can be changed using special commands. Thus, a message subject and the message content can be changed, for example, for changing the message status (i.e., level of importance, urgency status, etc.). Similarly, other fields, such as to/from/cc/bcc, timestamps, etc. can also be used (and are restored together with the email).

In step 314 the selected data can be assembled into email message using the MAPI. Then, the assembled message can be stored in the virtual folder or directly in the real folder.

An example illustrating creation of an email message using the data retrieved from the DB and saved into the assigned variables A, B, C, is provided below:
MAPISession1.SignOn
MAPIMessages1.SessionID=MAPISession1.SessionID
MAPIMessages1.Compose
MAPIMessages1.RecipAddress=A;
MAPIMessages1.MICROSOFTgSubject=B;
MAPIMessages1.MICROSOFTgNoteText=C.

In this example, the recipient's address is taken from the variable A, the message subject is taken from the variable B and the message content is taken from the variable C. Then, the message can be saved using the command "MAPISaveMail", in step 316. Alternatively, the message can be saved in the original location of this email into the MICROSOFT Exchange mailbox in step 317 (i.e., into the same mailbox and same subfolder, for example, into the Inbox if that is where the email was originally, in the Sent folder, or the Deleted folder, if that is where the email was, or into the folder or subfolder where the email was originally, and so on, so that the message or object is restored into the same place within the mailbox hierarchy). Alternatively, the message can be saved into a different mailbox folder or location specified by the user. In the case of restoring a more complex object such as an email folder, it can be restored into its place in the original hierarchy, or as a subfolder in another folder or inbox (if specified by the user). In the case of restoring an object such as a mail folder, it can be restored to the original MICROSOFT Exchange database that contained it (or to another database specified by the user). The virtual folder can be dismounted at step 318.

A mail can be created and saved to a pointed-to folder, but also this mail can be created and sent to addressee with using a command "MAPISendDocuments" (if files are attached to a mail), or this mail can be sent with using a command "MAPISendMail".

The virtualized and opened DB can be used for extracting information about addressee or about all addressees, about parameters and content of mail from DB. Also, a mail can be deleted from the virtualized DB, after that, all mails can be restored to pointed place. Such a method can be used, for example, for the restoration of mail messages without restoring those messages which contain spam.

Note that other mail servers, for example, AFTERLOGIC XMail Server, APACHE JAMES, COMMUNIGATE PRO, ICEWARP Mail Server, COURIER Mail Server, ESERV, EXIM, HMAIL Server, HULA, and others can be used instead of MICROSOFT Exchange Server.

Those of ordinary skill in the art will appreciate that the proposed message allows for fast and efficient retrieval of the MICROSOFT Exchange mail without restoration of the entire MICROSOFT Exchange DB.

Figure 4:
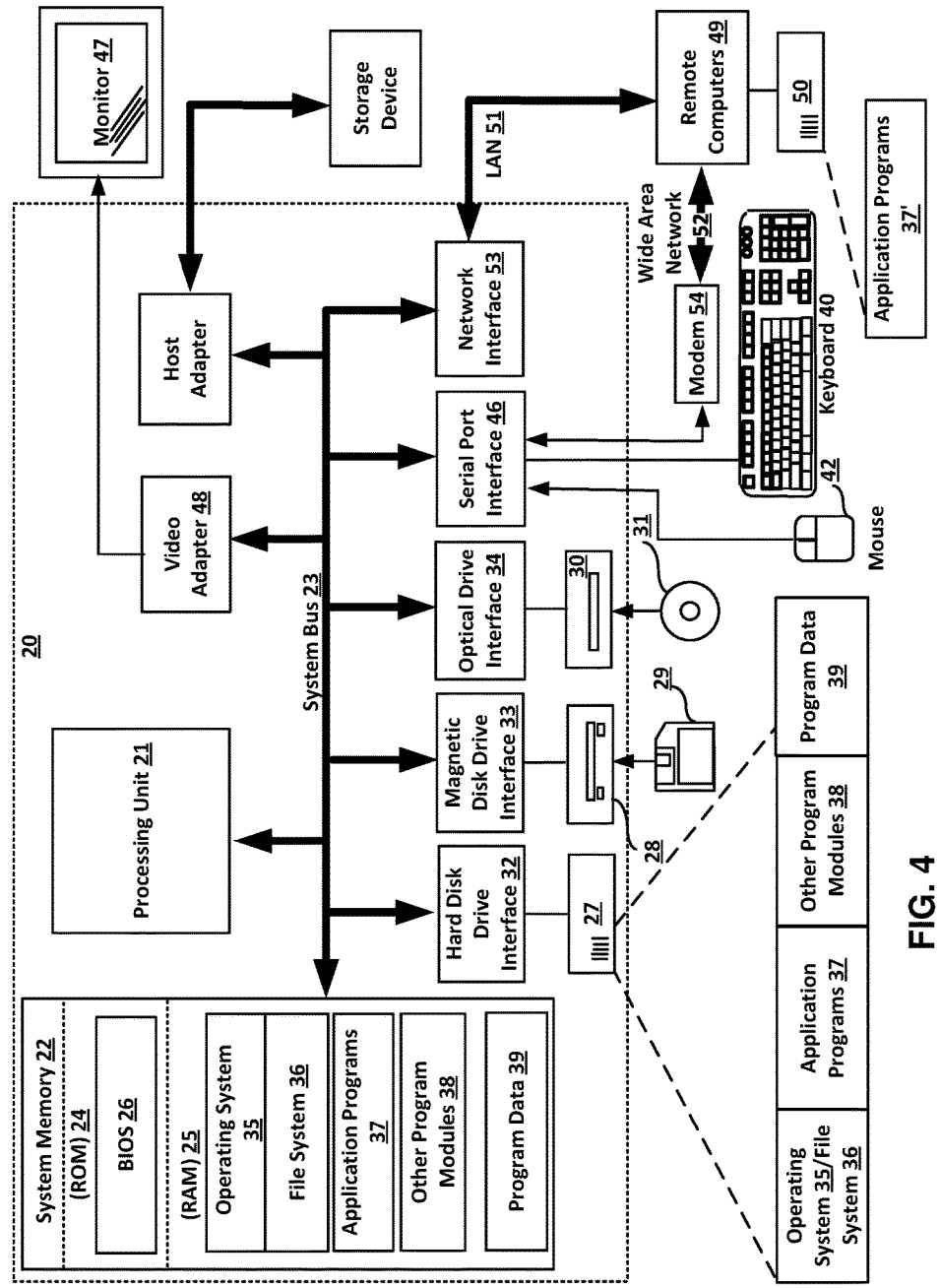
FIG. 4 illustrates an exemplary computer system that may be used for implementing the present invention.

With reference to FIG. 4, an exemplary system for implementing the invention includes a general purpose computing device in the form of a computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT WINDOWS, or LINUX). The computer 20 includes a file system 36 associated with or included within the operating system 35, such as the Windows NT™ File System (NTFS), one or more application programs 37, other program modules 38 and program data 39.

A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20. It may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A computer-implemented method for restoration of objects of a mail server, the method comprising:
launching a file system filter from a driver stack of a host operating system of the computer;
recovering, from an archive of the mail server, logs of transactions between the mail server and a database, wherein the logs reflect a journal of transactions occurring on the database;
synchronizing a virtualized database to the archive of the mail server by applying the logs of transactions to a virtual database file located in a virtual folder, wherein the virtual folder is mounted in a file system of the computer on which the mail server is running and the virtual folder does not correspond to a folder on a physical storage of the file system;
after the logs of transactions are applied, starting the virtualized database in the virtual folder with the virtual database file, without registering virtualized database with the mail server and without mounting the virtualized database file on a file system of the mail server;
querying the virtualized database using the file system filter to redirect the query from the archive to the virtualized database;
retrieving data for a single mail server object from the virtualized database in response to the query;
assembling the single mail server object from the data; and
saving the assembled single mail server object into its original location in a hierarchy of a user's mail box.

2. The method of claim 1, wherein the file system filter is a mounting point manager.

3. The method of claim 1, wherein the single mail server object is an email.

4. The method of claim 1, wherein the single mail server object is an email folder or subfolder.

5. The method of claim 1, wherein the single mail server object is a contact.

6. The method of claim 1, wherein the single mail server object is an appointment.

7. The method of claim 1, wherein the single mail server object is an inbox.

8. The method of claim 1, wherein a portion of the physical storage comprises a real folder.

9. The method of claim 1, wherein the archive is located on remote storage.

10. The method of claim 1, wherein the archive is located on cloud storage.

11. The method of claim 1, further comprising filtering out spam email messages during the retrieving.

12. The method of claim 1, further comprising installing the file system filter into the driver stack of the host operating system of the computer, wherein the file system filter intercepts requests to access the virtualized database and redirects them to the archive.

13. The method of claim 1, wherein the data is retrieved using an SQL or ESE query.

14. A system comprising:
a processor;
a memory coupled to the processor,
wherein the processor is configured to:
launch a file system filter from a driver stack of a host operating system of the computer;
recover, from an archive of the mail server, logs of transactions between the mail server and a database, wherein the logs reflect a journal of transactions occurring on the database;
synchronize a virtualized database to the archive of the mail server by applying the logs of transactions to a virtual database file located in a virtual folder, wherein the virtual folder is mounted in a file system of the computer on which the mail server is running and the virtual folder does not correspond to a folder on a physical storage of the file system;

after the logs of transactions are applied, start the virtualized database in the virtual folder with the virtual database file, without registering the virtualized database with the mail server and without mounting the virtualized database file on a file system of the mail server;

query the virtualized database using the file system filter to redirect the query from the archive to the virtualized database;

retrieve data for a single mail server object from the virtualized database in response to the query;

assemble the single mail server object from the data; and save the assembled single mail server object into its original location in a hierarchy of a user's mail box.

15. The system of claim 14, wherein the file system filter is a mounting point manager.

16. The system of claim 14, wherein the single mail server object is an email.

17. The system of claim 14, wherein the single mail server object is an email folder or subfolder.

18. A non-transitory computer-readable medium, storing instructions thereon for restoration of objects of a mail server, the instructions comprising:

launching a file system filter from a driver stack of a host operating system of the computer;

recovering, from an archive of the mail server, logs of transactions between the mail server and a database, wherein the logs reflect a journal of transactions occurring on the database;

synchronizing a virtualized database to the archive of the mail server by applying the logs of transactions to a virtual database file located in a virtual folder, wherein the virtual folder is mounted in a file system of the computer on which the mail server is running and the virtual folder does not correspond to a folder on a physical storage of the file system;

after the logs of transactions are applied, starting the virtualized database in the virtual folder with the virtual database file, without registering the virtualized database with the mail server and without mounting the virtualized database file on a file system of the mail server;

querying the virtualized database using the file system filter to redirect the query from the archive to the virtualized database;

retrieving data for a single mail server object from the virtualized database in response to the query;

assembling the single mail server object from the data; and saving the assembled single mail server object into its original location in a hierarchy of a user's mail box.

19. The medium of claim 18, wherein the file system filter is a mounting point manager.

20. The medium of claim 18, the instructions further comprising installing the file system filter into the driver stack of the host operating system of the computer, wherein the file system filter intercepts requests to access the virtualized database and redirects them to the archive.

* * * * *